(12) United States Patent
Breton et al.

(10) Patent No.: US 7,868,592 B2
(45) Date of Patent: Jan. 11, 2011

(54) METHOD OF AUTOMOTIVE ELECTRICAL BUS MANAGEMENT

(75) Inventors: Mathew Ethan Breton, Westland, MI (US); James Raymond Winkelman, Bloomfield, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 615 days.

(21) Appl. No.: 11/953,326

(22) Filed: Dec. 10, 2007

(65) Prior Publication Data

US 2009/0146616 A1      Jun. 11, 2009

(51) Int. Cl.
*H01M 10/44* (2006.01)
(52) U.S. Cl. ...................................... 320/132
(58) Field of Classification Search .................. 320/107, 320/114, 115, 132, 149, 150, DIG. 21; 324/426, 324/427, 431, 433; 702/63, 64, 65; 429/90, 429/91, 92
See application file for complete search history.

(56) References Cited

U.S. PATENT DOCUMENTS

| | | | |
|---|---|---|---|
| 3,082,370 A | 3/1963 | Hallidy |
| 4,308,492 A | 12/1981 | Mori et al. |
| 4,463,305 A | 7/1984 | Wineland et al. |
| 4,558,281 A | 12/1985 | Codd et al. |
| 4,625,281 A | 11/1986 | Deutsch |
| 4,659,977 A | 4/1987 | Kissel et al. |
| 5,079,716 A | 1/1992 | Lenhardt et al. |
| 5,080,059 A | 1/1992 | Yoshida et al. |
| 5,216,350 A | 6/1993 | Judge et al. |
| 5,235,946 A | 8/1993 | Fodale et al. |
| 5,249,559 A | 10/1993 | Weber et al. |
| 5,270,575 A | 12/1993 | Togai et al. |
| 5,337,013 A | 8/1994 | Langer et al. |
| 5,352,971 A | 10/1994 | Nishimura |
| 5,385,126 A | 1/1995 | Matthews |
| 5,402,007 A | 3/1995 | Center et al. |
| 5,467,008 A | 11/1995 | Uchinami |
| 5,481,176 A | 1/1996 | DeBiasi et al. |
| 5,561,360 A | 10/1996 | Ayres et al. |
| 5,581,172 A | 12/1996 | Iwatani et al. |
| 5,596,262 A | 1/1997 | Boll |
| 5,644,213 A | 7/1997 | Reneham |
| 5,666,917 A | 9/1997 | Fraser et al. |
| 5,693,986 A | 12/1997 | Vettraino, Jr. et al. |
| 5,712,786 A | 1/1998 | Ueda |
| 5,745,534 A | 4/1998 | DeBiasi et al. |
| 5,761,072 A | 6/1998 | Bardsley, Jr. et al. |
| 5,880,577 A | 3/1999 | Aoyama et al. |
| 5,929,609 A | 7/1999 | Joy et al. |
| 5,986,439 A | 11/1999 | Pletta et al. |
| 5,990,881 A | 11/1999 | Inoue et al. |
| 5,998,881 A | 12/1999 | Wind et al. |
| 6,018,234 A | 1/2000 | de Savasse |

(Continued)

*Primary Examiner*—Edward Tso
(74) *Attorney, Agent, or Firm*—Dickinson Wright PLLC

(57) ABSTRACT

A method for managing a vehicle's electrical power bus and charging system. A current sensor is utilized to measure a current produced by an alternator. The alternator current is controlled in a feedback system such that the current is equal to the amount required for the vehicle loads or, if the battery is being charged, the amount required for the vehicle loads plus the optimum charging current. Alternatively, the method may measure and control the amount of current delivered to and from the battery such that, in a fuel efficiency mode, no current is delivered to the battery.

20 Claims, 2 Drawing Sheets

U.S. PATENT DOCUMENTS

| | | |
|---|---|---|
| 6,064,180 A | 5/2000 | Sullivan et al. |
| 6,076,964 A | 6/2000 | Wu et al. |
| 6,150,793 A | 11/2000 | Lesesky et al. |
| 6,166,523 A | 12/2000 | Singh et al. |
| 6,184,661 B1 | 2/2001 | Becker et al. |
| 6,194,877 B1 | 2/2001 | Judge et al. |
| 6,208,931 B1 | 3/2001 | Schoettle et al. |
| 6,211,653 B1 | 4/2001 | Stasko |
| 6,222,345 B1 | 4/2001 | Yamanashi |
| 6,236,188 B1 | 5/2001 | Beckerman et al. |
| 6,285,191 B1 | 9/2001 | Gollomp et al. |
| 6,329,823 B2 | 12/2001 | Blessing et al. |
| 6,331,762 B1 | 12/2001 | Bertness |
| 6,331,792 B1 | 12/2001 | Tonietto |
| 6,356,083 B1 | 3/2002 | Ying |
| 6,404,163 B1 | 6/2002 | Kapsokavathis et al. |
| 6,424,127 B1 | 7/2002 | Ishii |
| 6,424,157 B1 | 7/2002 | Gollomp et al. |
| 6,441,586 B1 | 8/2002 | Tate, Jr. et al. |
| 6,469,512 B2 | 10/2002 | Singh et al. |
| 6,515,456 B1 | 2/2003 | Mixon |
| 6,548,990 B2 | 4/2003 | Okuno et al. |
| 6,624,618 B2 | 9/2003 | Kernahan et al. |
| 6,763,296 B2 | 7/2004 | Aldrich, III et al. |
| 6,784,635 B2 | 8/2004 | Larson |
| 6,809,501 B2 | 10/2004 | Kapsokavathis et al. |
| 6,829,888 B2 | 12/2004 | Kuenstler et al. |
| 6,902,319 B2 | 6/2005 | Wu et al. |
| 6,909,287 B2 | 6/2005 | Bertness |
| 6,927,554 B2 | 8/2005 | Tate, Jr. et al. |
| 6,936,995 B2 | 8/2005 | Kapsokavathis et al. |
| 6,949,911 B2 | 9/2005 | Laig-Hoerstebrock et al. |
| 7,105,936 B2 | 9/2006 | Kubo |
| 2004/0012373 A1 | 1/2004 | Sakakibara et al. |
| 2004/0162683 A1 | 8/2004 | Verbrugge et al. |
| 2004/0206332 A1 | 10/2004 | Mathews et al. |
| 2005/0285445 A1* | 12/2005 | Wruck et al. ............. 307/10.1 |
| 2006/0108971 A1 | 5/2006 | Ono |
| 2006/0139004 A1 | 6/2006 | Uesugi et al. |
| 2006/0273762 A1 | 12/2006 | Yamaji et al. |
| 2007/0090803 A1 | 4/2007 | Yun et al. |
| 2007/0090805 A1 | 4/2007 | Mizuno et al. |
| 2007/0213891 A1* | 9/2007 | Musser ....................... 701/22 |

* cited by examiner

METHOD OF AUTOMOTIVE ELECTRICAL BUS MANAGEMENT

RELATED APPLICATIONS

None.

STATEMENT REGARDING FEDERALLY SPONSORED RESEARCH

None

TECHNICAL FIELD

This invention relates generally to a method for managing a vehicle's electrical power bus and charging system and, more particularly, to a method that utilizes a current-based control algorithm to maximize fuel economy, minimize Noise/Vibration/Harshness ("NVH") and maximize battery life.

BACKGROUND OF THE INVENTION

Current automotive systems manage the charging of a vehicle battery by regulating the power generation of the alternator. In these systems, the voltage output of the alternator is regulated to, first, provide the necessary electrical power for the vehicle and passenger needs and, second, provide charge to the vehicle's battery. Typically, the alternator regulation scheme operates on the simple principle that an increase in a generated voltage of the alternator will charge the battery if it is at a lower voltage level. This principle is the basis for all prior art charging schemes.

It is well known in the prior art that a reduction in the power generated by the alternator increases fuel efficiency. Furthermore, continuous overcharging of a battery leads to a decrease in battery life and has other undesirable effects. In order to increase fuel efficiency and reduce overcharging in order to increase battery life, vehicles are operated so as to avoid the charging of a fully charged battery by the alternator. This is accomplished by controlling the voltage generated by the alternator, which reduces the current sent to the battery. There are, however, a number of disadvantages to this voltage-control based system. First, under most normal conditions, the electrical draw of the loads of a vehicle take precedence over the charging of the battery. Some of the loads of the vehicle (e.g., fuel pump, heated seats) may require a higher voltage under certain operating conditions and, thus, a fully-charged battery would still be subjected to an increased voltage under these conditions. Thus, a fully-charged battery would still be receiving a current from the alternator under these conditions. Second, even in cases where the vehicle loads do not require an increased voltage level, a non-zero current is still delivered to a fully-charged battery under voltage control.

There exists a need for an improved alternator control method that reduces or eliminates the delivery of unnecessary and potentially harmful current to a vehicle's fully-charged battery.

SUMMARY OF THE INVENTION

In general terms, this invention provides a method for controlling a vehicle electrical power system. The method determines a state of charge ("SOC") of a battery. The method compares the SOC of the battery to a SOC threshold. Then, the method controls a current produced by an alternator such that, if the SOC is less than the SOC threshold, the current produced by the alternator is substantially equal to a sum of a first current and a second current, wherein the first current approximates that required to power a vehicle load and wherein the second current approximates a preset charging current. In the event that the SOC is greater than the SOC threshold, the current produced by the alternator is substantially equal to the first current, i.e., the amount required to power a vehicle load.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

The present invention relates to a method for controlling the power system of a vehicle such that the vehicle battery is not provided with unnecessary and potentially harmful current in a fully-charged state.

Figure 1:
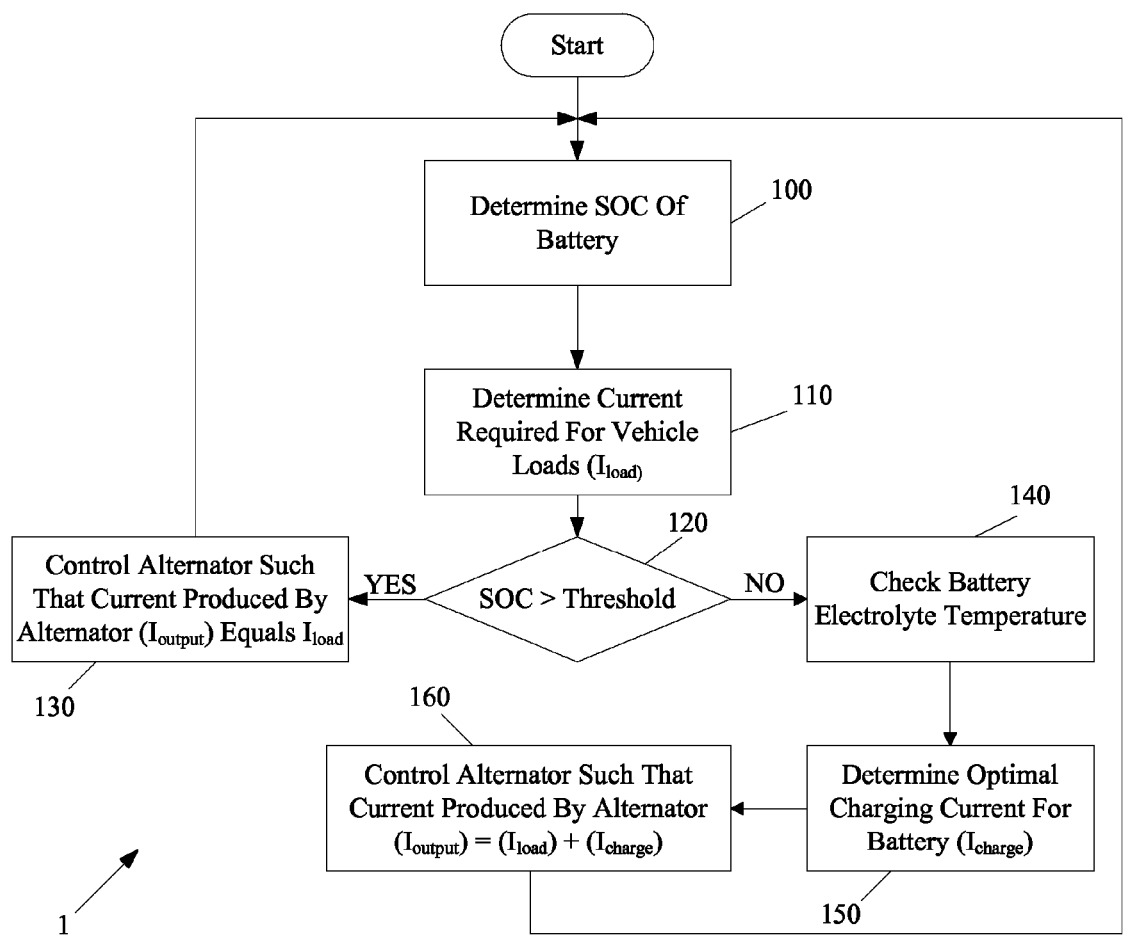
FIG. 1 is a flowchart illustrating the steps of one embodiment of the present invention.

In one embodiment, which is illustrated in the flowchart of FIG. 1, the present invention relates to a method of controlling a vehicle's alternator. The method 1 as illustrated may be used as a stand-alone alternator control method or, alternatively, as one of a plurality of modes of alternator control. For example, the described method can be used in conjunction with traditional voltage control methods as an optimal charging mode (when the vehicle battery needs to be charged) and fuel efficiency mode (when the vehicle battery is fully charged). The methods of transitioning between modes of alternator control are well-known in the art and, thus, discussion of such methods is omitted.

Once it is determined that the alternator should pass to this method, e.g., by the vehicle's ECU, the method 1 begins by determining the State-Of-Charge ("SOC") of the vehicle battery at step 100. This SOC determination will be used to later in the control method 1. At step 110, the amount of current required to power all of the loads of the vehicle is determined (this current is referred to herein as $I_{load}$). The SOC is compared, at step 120, to a predetermined threshold. This threshold is set at a level such that, if the SOC of the vehicle battery is below the threshold, the battery should be charged and, if the SOC of the vehicle battery is above the threshold, the battery should not be charged. In an alternative embodiment, two thresholds can be utilized by the method such that the vehicle battery will not be charged unless its SOC falls below a first threshold, but if the battery is being charged, it will continue charging until its SOC goes above a second threshold.

Referring again to FIG. 1, if at step 120 it is determined that the SOC of the battery is greater than the threshold SOC, the method 1 of the present invention directs the alternator to produce a current ($I_{output}$) equal to $I_{load}$, the current required to power the vehicle loads, at step 130, and returns to the beginning of the process. This mode may be referred to as a fuel efficiency mode, because no unnecessary current will be produced by the alternator. Alternatively, if the SOC of the battery is less than the threshold SOC, the battery charging mode is entered and the battery electrolyte temperature is measured at step 140. The battery electrolyte temperature is utilized to determine the optimal charging current to be delivered to the battery (referred to herein as $I_{charge}$) at step 150. In one embodiment, this $I_{charge}$ value is determined by lookup table. In another embodiment, $I_{charge}$ is based not only on the battery electrolyte temperature, but also the SOC of the battery, and other factors could be used in the determination of the optimal $I_{charge}$ value. The method then proceeds to step 160, in which the alternator is controlled such that it produces a current that is equal to the optimal charging current plus the current required to power the vehicle loads, i.e., such that $I_{output} = I_{load} + I_{charge}$. After step 160, the method 1 returns to the beginning of the process.

Figure 2:
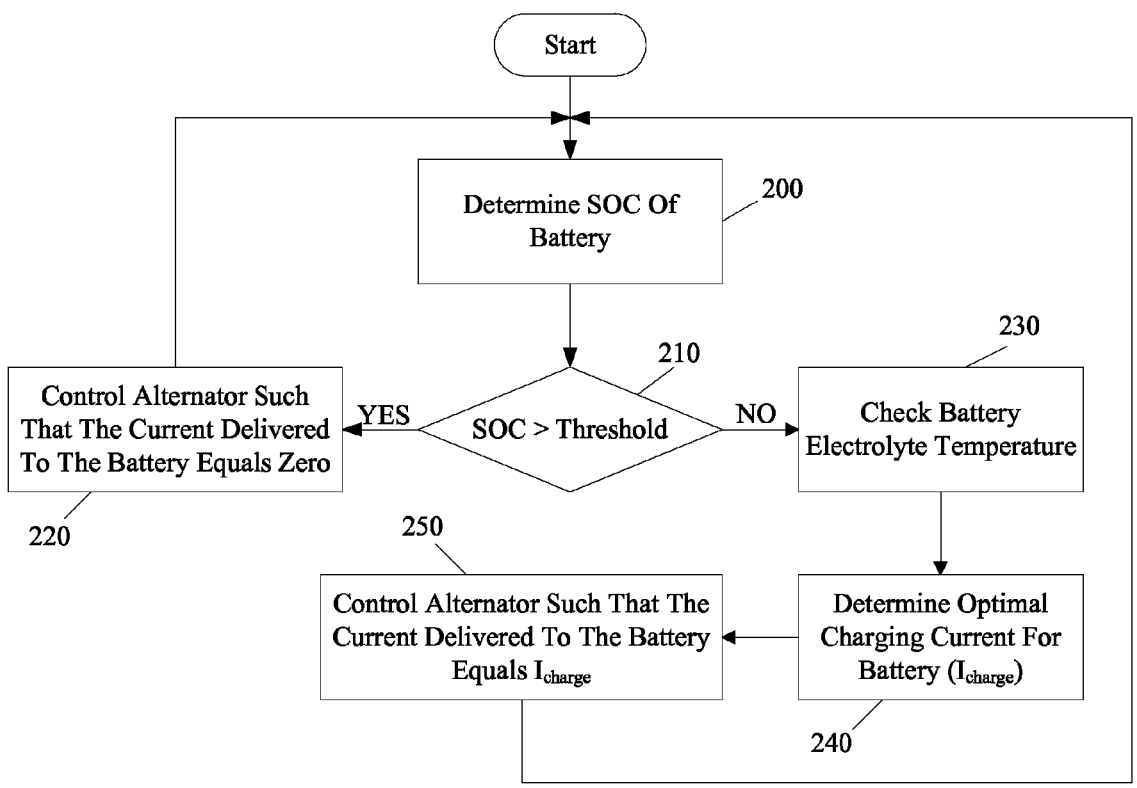
FIG. 2 is a flowchart illustrating the steps of an alternative embodiment of the present invention.

Referring to FIG. 2, an alternative embodiment of the present invention is illustrated. The embodiment of this method 2 includes many of the same steps as that discussed above. At step 200, the SOC of the battery is determined. The SOC is compared with a threshold at step 210 (as discussed above, two or more thresholds could be used). If the SOC is greater than the threshold, at step 220 the alternator is controlled such that the current delivered to the battery ($I_{battery}$) is zero, or as close to zero as practical. This alternative method 2 has the same effect as the method 1 described above in that the alternator will produce a current ($I_{output}$) that is equal to the amount required for the vehicle loads ($I_{load}$). If the SOC is less than the threshold at step 210, the method 2 will enter the battery charging mode. In this mode, the battery electrolyte temperature will be measured at step 230 in order to determine the optimal charging current ($I_{charge}$) at step 240, via lookup table or other known methods. At step 250, the method 2 controls the alternator such that the current delivered to the battery ($I_{battery}$) is equal to the $I_{charge}$ value.

The various methods of alternator control described above can be performed by known alternator control systems. For example, the vehicle's Engine Control Unit or Body Control Module may be programmed to perform these methods. Alternatively, a stand-alone processor can be utilized with these methods, e.g., a stand-alone electronic control module that is put in communication (e.g., by CAN) with the ECU or BCM to get the required inputs (e.g., battery temp, engine speed, vehicle speed). In either case, the remaining components necessary to perform these methods comprise: a battery temperature sensor or known alternative, a current sensor and a system for measuring battery SOC. These elements can be arranged such that the current can be controlled by a closed-loop feedback controller. In the embodiment of FIG. 1, the current sensor is arranged to monitor the alternator output current $I_{output}$. In the alternative embodiment of FIG. 2, the current sensor is arranged to monitor the current delivered to and from the vehicle battery, e.g., by attaching directly to the battery cables. Alternative systems are possible, and fall within the scope of the present invention.

As stated above, the present invention can be used in conjunction with other alternator control mechanisms, including those well-known voltage control methods of the prior art, and adding additional steps to those described above fall within the scope of the present invention. For example, and not by way of limitation, it is desirable to add an additional anti-sulfation step to the described methods. This anti-sulfation step contemplates periodically increasing the current delivered to the battery to increase battery life and performance. Thus, even though the described methods above contemplate only that the alternator current be equal to $I_{load}$ or ($I_{load} + I_{charge}$), it is within the scope of the present invention to occasionally add an anti-sulfation current ($I_{sulfation}$) to $I_{load}$ during the fuel efficiency mode for this purpose.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for controlling a vehicle electrical power system, comprising:
   determining a state of charge ("SOC") of a battery;
   comparing said SOC of said battery to a SOC threshold; and
   controlling a current produced by an alternator, wherein:
      if said SOC is less than said SOC threshold, said current produced by said alternator is substantially equal to a sum of a first current and a second current, wherein said first current approximates that required to power a vehicle load and wherein said second current approximates a preset charging current; and
      if said SOC is greater than said SOC threshold, said current produced by said alternator is substantially equal to said first current.

2. The method of claim 1, further comprising the step of monitoring a battery current delivered to or from said battery.

3. The method of claim 2, wherein said preset charging current is related to a battery temperature.

4. The method of claim 2, wherein the step of controlling said current produced by said alternator comprises the step of reducing said second current to zero if said SOC is greater than said SOC threshold.

5. The method of claim 2, wherein said preset charging current is related to said SOC.

6. The method of claim 2, wherein the step of controlling said current produced by said alternator is performed by a closed-loop feedback controller.

7. The method of claim 1, wherein said preset charging current is related to a battery temperature.

8. The method of claim 7, wherein the step of controlling said current produced by said alternator comprises the step of reducing said second current to zero if said SOC is greater than said SOC threshold.

9. The method of claim 7, wherein said preset charging current is related to said SOC.

10. The method of claim 7, wherein the step of controlling said current produced by said alternator is performed by a closed-loop feedback controller.

11. The method of claim 1, wherein the step of controlling said current produced by said alternator comprises the step of reducing said second current to zero if said SOC is greater than said SOC threshold.

12. The method of claim 11, wherein said preset charging current is related to said SOC.

13. The method of claim 11, wherein the step of controlling said current produced by said alternator is performed by a closed-loop feedback controller.

14. The method of claim 1, wherein said preset charging current is related to said SOC.

15. The method of claim 14, wherein the step of controlling said current produced by said alternator is performed by a closed-loop feedback controller.

16. The method of claim 1, wherein the step of controlling said current produced by said alternator is performed by a closed-loop feedback controller.

17. The method of claim 16, wherein the step of controlling said current produced by said alternator comprises the step of reducing said second current to zero if said SOC is greater than said SOC threshold.

18. The method of claim 17, further comprising the step of monitoring a battery current delivered to or from said battery.

19. The method of claim 1, wherein the step of controlling said current produced by said alternator comprises the step of periodically pulsing an increase in said current in order to inhibit battery sulfation.

20. The method of claim 19, wherein the step of controlling said current produced by said alternator further comprises the step of reducing said second current to zero if said SOC is greater than said SOC threshold.

* * * * *